(12) United States Patent
Maximov et al.

(10) Patent No.: US 10,043,039 B2
(45) Date of Patent: Aug. 7, 2018

(54) VERIFICATION PATHS OF LEAVES OF A TREE

(71) Applicant: Telefonaktiebolaget L M Ericsson (publ), Stockholm (SE)

(72) Inventors: Alexander Maximov, Lund (SE); Christine Jost, Bromma (SE); Bernard Smeets, Dalby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 301 days.

(21) Appl. No.: 14/443,779

(22) PCT Filed: Apr. 10, 2015

(86) PCT No.: PCT/EP2015/057900
§ 371 (c)(1),
(2) Date: May 19, 2015

(87) PCT Pub. No.: WO2016/162094
PCT Pub. Date: Oct. 13, 2016

(65) Prior Publication Data
US 2017/0046536 A1    Feb. 16, 2017

(51) Int. Cl.
*G06F 21/00* (2013.01)
*G06F 21/64* (2013.01)
*H04L 9/32* (2006.01)

(52) U.S. Cl.
CPC ............ *G06F 21/64* (2013.01); *H04L 9/3239* (2013.01)

(58) Field of Classification Search
CPC ........ G06F 21/64; H04L 9/239; H04L 9/3239
See application file for complete search history.

(56) References Cited

U.S. PATENT DOCUMENTS

| 6,097,811 A | * | 8/2000 | Micali ................ G06F 21/33 |
| | | | 713/158 |
| 2008/0095360 A1 | | 4/2008 | Vuillaume et al. |
| 2010/0110935 A1 | * | 5/2010 | Tamassia ............ H04L 63/12 |
| | | | 370/256 |
| 2015/0222619 A1 | * | 8/2015 | Hughes ............... H04L 63/08 |
| | | | 713/168 |

OTHER PUBLICATIONS

Jakobsson, Markus et al., "Fractal Merkle Tree Representation and Traversal", Springer-Verlag, 2003, 314-326.

* cited by examiner

*Primary Examiner* — Ghodrat Jamshidi
(74) *Attorney, Agent, or Firm* — Murphy, Bilak & Homiller, PLLC

(57) ABSTRACT

There is provided mechanisms for determining a verification path for each leaf of a tree. A method is performed by a tree manager processor. The method comprises acquiring leaf values of leaves of a tree. The method comprises determining a root value from a leaf to the root value of the leaves. The method comprises determining a verification path for each of the leaves. The verification path for each of the leaves is determined such that the size of each verification path is independent from the number of leaves. Each verification path comprises a partial result and a function that enables determination of said root value from its leaf value and said partial result. The partial result for the verification path for leaf is determined as a one-way function depending only on other leaves such that the verification path for leaf prohibits re-computation of any other leaf value from said partial result.

13 Claims, 6 Drawing Sheets

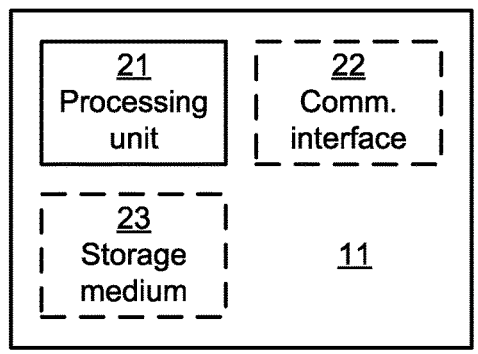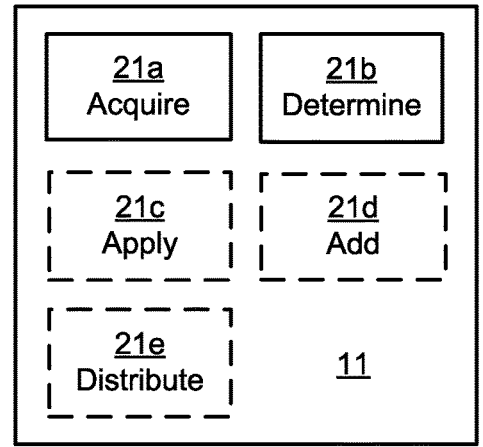
Fig. 2a
Fig. 2b
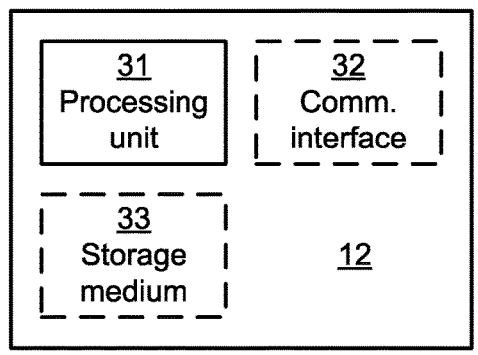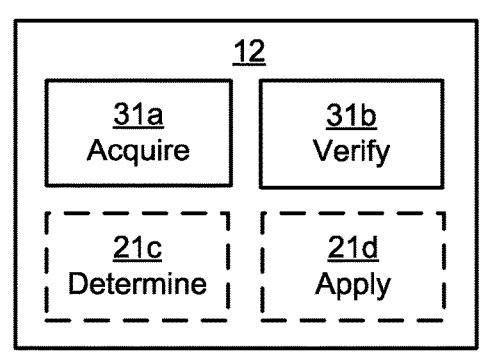
Fig. 3a
Fig. 3b

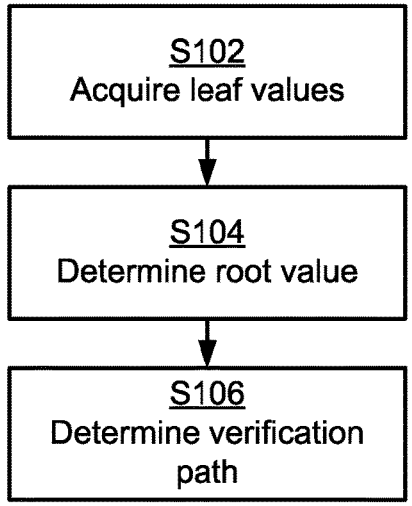
Fig. 5
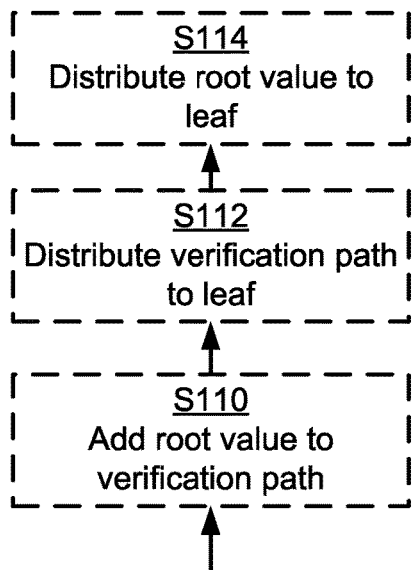
Fig. 6
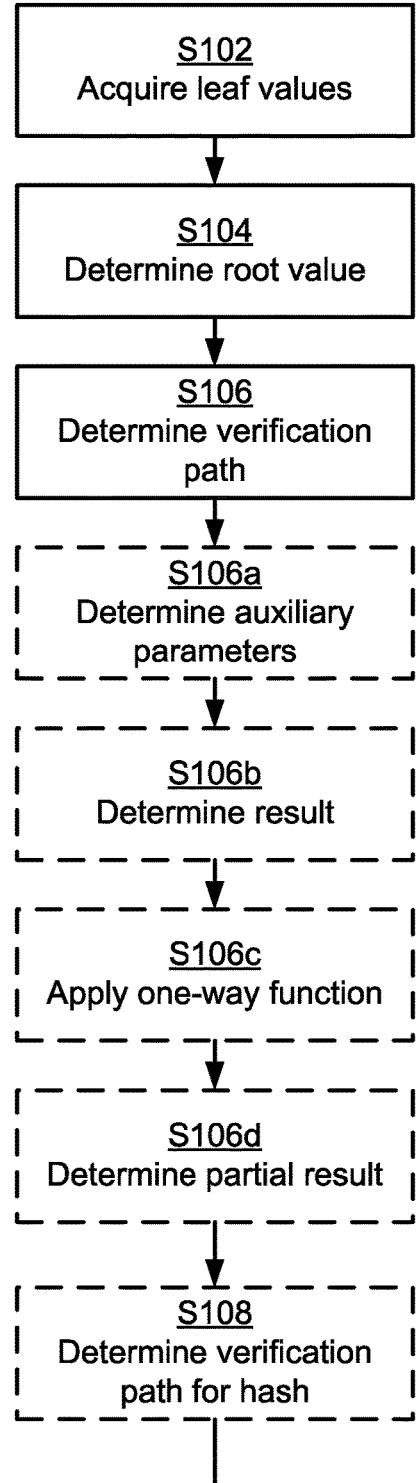

VERIFICATION PATHS OF LEAVES OF A TREE

TECHNICAL FIELD

Embodiments presented herein relate to trees, and particularly to a method, a tree manager processor, and a computer program, and a computer program product for determining a verification path for each leaf of a tree. Further embodiments presented herein particularly relate to a method, a verification processor, and a computer program, and a computer program product for verifying a verification path for leaves of the tree.

BACKGROUND

In communications networks, there may be a challenge to obtain good performance and capacity for a given communications protocol, its parameters and the physical environment in which the communications network is deployed.

For example, one parameter in providing good performance and capacity for a given communications protocol in a communications network is the ability to provide different kinds of security mechanisms. One component used in different kinds of security mechanism is hash values. Hash values may be determined by using hash trees. In general terms, in cryptography and computer science, a hash tree or, specifically, a Merkle tree, is a tree in which every non-leaf node is labelled with the hash of the labels of its children nodes.

Hash trees are useful because they allow efficient and secure verification of the contents of large data structures. Hash trees are a generalization of hash lists and hash chains. Hash trees can be used to verify any kind of data stored, handled and transferred in and between computers.

In general terms, a Merkle tree is a binary hash tree of height n and having $2^n$ leaves, where a node value is computed as the hash of the concatenation of its direct children values. Starting from leaf values one may compute the root hash value, also denoted root value or hash digest, associated with the root node of the tree.

Merkle trees have found many applications in various cryptographic schemes, such as hash-based one-time signatures, hash-based authentication schemes, and others. In those schemes, the hash path, also denoted verification path, from a leaf to the root contains n hashes and is seen as a proof of knowledge of the leaf value. In other schemes, the hash path, or verification path, is seen as the authentication of a one-time password or key, that is actually the leaf value.

The hash path in a Merkle tree is of size n times the size of the root value. For a large Merkle tree this may be a problem since the hash path becomes large, and the verification time needs to call a hash algorithm n times.

Hence, there is still a need for efficient verification paths for leaves in a tree and for efficient verification of such verification paths.

SUMMARY

An object of embodiments herein is to provide efficient verification paths for leaves in a tree.

According to a first aspect there is presented a method for determining a verification path for each leaf of a tree. The method is performed by a tree manager processor. The method comprises acquiring leaf values of leaves of a tree. The method comprises determining a root value RV of the leaves. The method comprises determining a verification path from a leaf to the root value for each of the leaves. The verification path for each of the leaves is determined such that the size of each verification path is independent from the number of leaves m. Each verification path comprises a partial result and a function that enables determination of said root value from its leaf value and said partial result. The partial result for the verification path for one leaf is determined as a one-way function depending only on other leaves such that the verification path for this leaf prohibits re-computation of any other leaf value from said partial result.

Advantageously this provides efficient verification paths for leaves in a tree.

Advantageously this provides short verification paths for the leaves.

Advantageously this allows for fast verification of the verification paths.

According to a second aspect there is presented a tree manager processor for determining a verification path for each leaf of a tree. The tree manager processor comprises a processing unit. The processing unit is configured to cause the tree manager processor to acquire leaf values of leaves of a tree. The processing unit is configured to cause the tree manager processor to determine a root value of the leaves. The processing unit is configured to cause the tree manager processor to determine a verification path from a leaf to the root value for each of the leaves. The processing unit is configured to cause the tree manager processor to determine a verification path for each of the leaves such that the size of each verification path is independent from the number of leaves m. Each verification path comprises a partial result and a function that enables determination of said root value from its leaf value and said partial result. The partial result for the verification path for leaf is determined as a one-way function depending only on other leaves such that the verification path for leaf prohibits re-computation of any other leaf value from said partial result.

According to a third aspect there is presented a computer program for determining a verification path for each leaf of a tree, the computer program comprising computer program code which, when run on a processing unit of a tree manager processor, causes the tree manager processor to perform a method according to the first aspect.

A further object of embodiments herein is to provide efficient verification of verification paths for leaves in a tree.

According to a fourth aspect there is presented a method for verifying a verification path of a leaf of a tree. The method is performed by a verification processor. The method comprises acquiring a leaf value of leaf of a tree. The method comprises acquiring a verification path for said leaf. The method comprises acquiring a previously determined root value of the leaf. The method comprises verifying the acquired verification path by determining a root value of its own of the leaf using the acquired verification path and the leaf value, and by comparing the previously determined root value to said root value of its own.

Advantageously this provides efficient verification of verification paths for leaves in a tree.

According to a fifth aspect there is presented a verification processor for verifying a verification path of a leaf of a tree. The verification processor comprises a processing unit. The processing unit is configured to cause the verification processor to acquire a leaf value of leaf of a tree. The processing unit is configured to cause the verification processor to acquire a verification path for said leaf. The processing unit is configured to cause the verification processor to acquire a previously determined root value of the leaf. The processing unit is configured to cause the verification processor to verify the acquired verification path by determining a root value of its own of the leaf using the acquired verification path and the leaf value, and by comparing the previously determined root value RV to said root value RV of its own.

According to a sixth aspect there is presented a computer program for verifying a verification path of a leaf of a tree, the computer program comprising computer program code which, when run on a processing unit of a verification processor, causes the verification processor to perform a method according to the fourth aspect.

According to a seventh aspect there is presented a computer program product comprising a computer program according to at least one of the third aspect and the sixth aspect and a computer readable means on which the computer program is stored.

It is to be noted that any feature of the first, second, third, fourth, fifth, sixth and seventh aspects may be applied to any other aspect, wherever appropriate. Likewise, any advantage of the first aspect may equally apply to the second, third, fourth, fifth, sixth, and/or seventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIG. 2a is a schematic diagram showing functional units of a tree manager processor according to an embodiment;

FIG. 2b is a schematic diagram showing functional modules of a tree manager processor according to an embodiment;

FIG. 3a is a schematic diagram showing functional units of a verification processor according to an embodiment;

FIG. 3b is a schematic diagram showing functional modules of a verification processor according to an embodiment;

FIGS. 5, 6, 7, and 8 are flowcharts of methods according to embodiments; and

DETAILED DESCRIPTION

Figure 1:
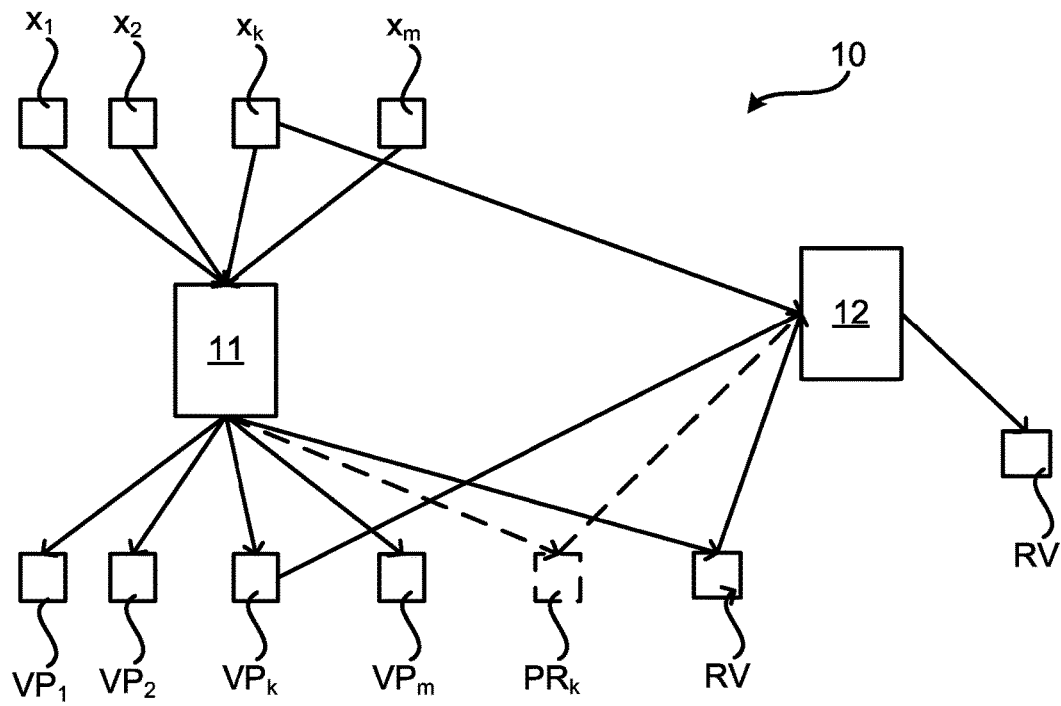
FIG. 1 is a schematic diagram illustrating a network according to embodiments.

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Embodiments disclosed herein particularly relate to determining a verification path for each leaf $l_k$, for k=1, . . . , m, of a tree, where m is the number of leaves in the tree. In order to obtain such determination there is provided a tree manager processor, a method performed by the tree manager processor, a computer program comprising code, for example in the form of a computer program product, that when run on a processing unit of the tree manager processor, causes the tree manager processor to perform the method. Embodiments disclosed herein further particularly relate to verifying a verification path of a leaf $l_k$ of a tree. In order to obtain such verification there is provided a verification processor, a method performed by the verification processor, and a computer program comprising code, for example in the form of a computer program product, that when run on a processing unit of the verification processor, causes the verification processor to perform the method.

FIG. 2a schematically illustrates, in terms of a number of functional units, the components of a tree manager processor according to an embodiment. A processing unit 21 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 41a (as in FIG. 4), e.g. in the form of a storage medium 23. Thus the processing unit 21 is thereby arranged to execute methods as herein disclosed. The storage medium 23 may also comprise persistent storage, which, for example, can be any single one or combination of magnetic memory, optical memory, solid state memory or even remotely mounted memory. The tree manager processor may further comprise a communications interface 22 for communications with other devices and logical entities. As such the communications interface 22 may comprise one or more transmitters and receivers, comprising analogue and digital components and a suitable number of antennas for wireless communications and ports for wireline communications. The processing unit 21 controls the general operation of the tree manager processor e.g. by sending data and control signals to the communications interface 22 and the storage medium 23, by receiving data and reports from the communications interface 22, and by retrieving data and instructions from the storage medium 23. Other components, as well as the related functionality, of the tree manager processor are omitted in order not to obscure the concepts presented herein.

FIG. 2b schematically illustrates, in terms of a number of functional modules, the components of a tree manager processor according to an embodiment. The tree manager processor of FIG. 2b comprises a number of functional modules; an acquire module 21a configured to perform below step S102, and a determine module 21b configured to perform below steps S104, S106, S106a, S106b, S106d, S108. The tree manager processor of FIG. 2b may further comprises a number of optional functional modules, such as any of an apply module 21c configured to perform below step S106 can add module 21d configured to perform below step S110, and a distribute module 21e configured to perform below steps S112, S114. The functionality of each functional module 21a-e will be further disclosed below in the context of which the functional modules 21a-e may be used. In general terms, each functional module 21a-e may be implemented in hardware or in software. Preferably, one or more or all functional modules 21a-e may be implemented by the processing unit 21, possibly in cooperation with functional units 22 and/or 23. The processing unit 21 may thus be arranged to from the storage medium 23 fetch instructions as provided by a functional module 21a-f and to execute these instructions, thereby performing any steps as will be disclosed hereinafter.

FIG. 3a schematically illustrates, in terms of a number of functional units, the components of a verification processor according to an embodiment. A processing unit 31 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 41b (as in FIG. 4), e.g. in the form of a storage medium 33. Thus the processing unit 31 is thereby arranged to execute methods as herein disclosed. The storage medium 33 may also comprise persistent storage, which, for example, can be any single one or combination of magnetic memory, optical memory, solid state memory or even remotely mounted memory. The verification processor may further comprise a communications interface 32 for communications with other devices and logical entities. As such the communications interface 32 may comprise one or more transmitters and receivers, comprising analogue and digital components and a suitable number of antennas for wireless communications and ports for wireline communications. The processing unit 31 controls the general operation of the verification processor e.g. by sending data and control signals to the communications interface 32 and the storage medium 33, by receiving data and reports from the communications interface 32, and by retrieving data and instructions from the storage medium 33. Other components, as well as the related functionality, of the verification processor are omitted in order not to obscure the concepts presented herein.

FIG. 3b schematically illustrates, in terms of a number of functional modules, the components of a verification processor according to an embodiment. The verification processor of FIG. 3b comprises a number of functional modules; an acquire module 31a configured to perform below steps S202, S204, S206, S208b, and a verify module 31b configured to perform below step S208. The verification processor of FIG. 3b may further comprise a number of optional functional modules, such as any of a determine module 31c configured to perform step S208a, and an apply module 31d configured to perform step S208c. The functionality of each functional module 31a-d will be further disclosed below in the context of which the functional modules 31a-d may be used. In general terms, each functional module 31a-d may be implemented in hardware or in software. Preferably, one or more or all functional modules 31a-d may be implemented by the processing unit 31, possibly in cooperation with functional units 32 and/or 33. The processing unit 31 may thus be arranged to from the storage medium 33 fetch instructions as provided by a functional module 31a-b and to execute these instructions, thereby performing any steps as will be disclosed hereinafter.

Figure 4:
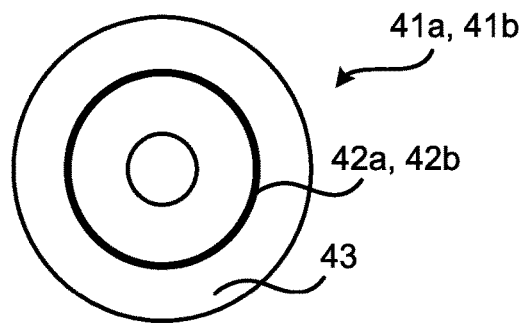
FIG. 4 shows one example of a computer program product comprising computer readable means according to an embodiment.

FIG. 4 shows one example of a computer program product 41a, 41b comprising computer readable means 43. On this computer readable means 43, a computer program 42a can be stored, which computer program 42a can cause the processing unit 21 and thereto operatively coupled entities and devices, such as the communications interface 22 and the storage medium 23, to execute methods according to embodiments described herein. The computer program 42a and/or computer program product 41a may thus provide means for performing any steps of the tree manager processor as herein disclosed. On this computer readable means 43, a computer program 42b can be stored, which computer program 42b can cause the processing unit 31 and thereto operatively coupled entities and devices, such as the communications interface 32 and the storage medium 33, to execute methods according to embodiments described herein. The computer program 42b and/or computer program product 41b may thus provide means for performing any steps of the verification processor as herein disclosed.

In the example of FIG. 4, the computer program product 41a, 41b is illustrated as an optical disc, such as a CD (compact disc) or a DVD (digital versatile disc) or a Bu-Ray disc. The computer program product 41a, 41b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 42a, 42b is here schematically shown as a track on the depicted optical disk, the computer program 42a, 42b can be stored in any way which is suitable for the computer program product 41a, 41b.

Figure 7:
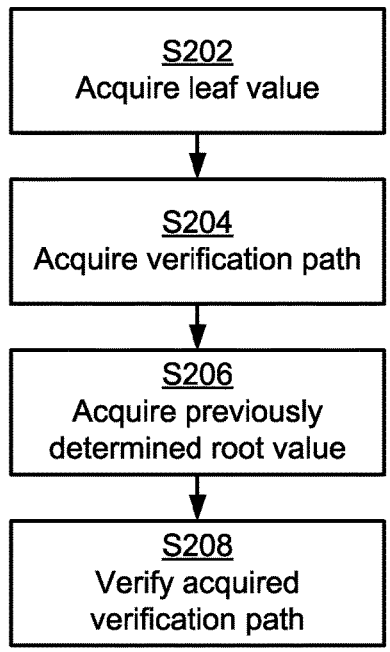
Figure 8:
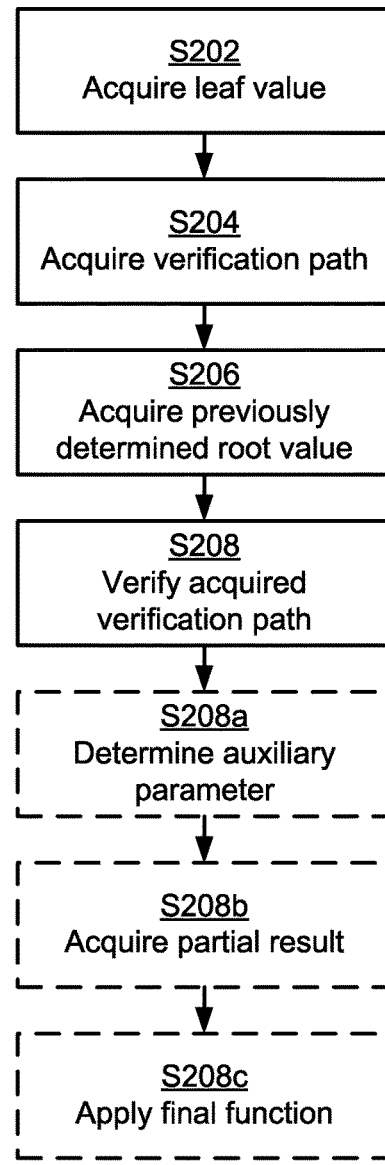

FIGS. 5 and 6 are flow charts illustrating embodiments of methods for determining a verification path for each leaf $l_k$, for k=1, . . . , m of a tree as performed by the tree manager processor. FIGS. 7 and 8 are flow charts illustrating embodiments of methods for verifying a verification path of a leaf $l_k$, for k=1, . . . , m of a tree as performed by the verification processor. The methods are advantageously provided as computer programs 42a, 42b.

Reference is now made to FIG. 5 illustrating a method for determining a verification path for each leaf $l_k$, for k=1, . . . , m of a tree as performed by the tree manager processor according to an embodiment.

Parallel reference is made to FIG. 1. FIG. 1 is a schematic diagram illustrating a network 10 where embodiments presented herein can be applied. The network 10 comprises a tree manager processor ii and a verification processor 12.

Since verification paths are to be determined for leaves in a tree, values of the leaves are acquired. The tree manager processor is thus configured to, in a step S102, acquire leaf values $x_k$ of leaves $l_k$, for k=1, . . . , m of a tree. Examples of what the leaves $l_k$ may represent will be provided below.

The tree manager processor is configured to, in a step S104, determine a root value RV of the leaves $l_k$. Examples of how the root value RV may be determined, and what the root value RV may represent, will be provided below.

The tree manager processor is configured to, in a step S106, determine a verification path $VP_k$ from a leaf $l_k$ to the root value RV for each of the leaves $l_k$. Hence, one verification path VPk is determined for one leaf $l_k$. The verification paths are determined such that the size of each verification path is independent from the number of leaves m. Each verification path comprises a partial result and a function that enables determination of the root value RV from its leaf value and the partial result. The partial result for the verification path for leaf $l_k$ is determined as a one-way function depending only on other leaves $l_j \neq l_k$ such that the verification path for leaf $l_k$ prohibits re-computation of any other leaf value from the partial result. The partial result may be regarded as a context value.

Embodiments relating to further details of determining a verification path for each leaf $l_k$, k=1, ..., m of a tree will now be disclosed.

The tree may be regarded as an alternative Merkle tree. The leaves $l_k$, k=1, ..., m may represent distinct hash digests, documents, hash values of documents log files, distinct one-time signing keys, authentication keys, default values, or any combination thereof. That is, the value xk may be a value chosen by the leafs user/owner. If the leaves are variable length documents, then $x_k$ may be represented by a hash value of that document. For example, $x_k$ may act as a one-time signing key that belongs to a signer. The signer may generates one or more one-time keys as the input to the tree, and then uses those keys one-by-one, revealing VPk when a used key xk is revealed.

There may be different ways to determine the root value RV. Different embodiments relating thereto will now be described in turn. According to one embodiment the root value RV is determined using a one-way function. For example, the root value RV may be a hash digest and hence the one-way function may be a hash function. According to one embodiment the root value RV is a value of the root in the tree, where the root value RV is based on values of the leaves x1, ..., xm in the tree.

Reference is now made to FIG. 6 illustrating methods for determining a verification path for each leaf $l_k$ of a tree as performed by the tree manager processor according to further embodiments.

There may be different ways to determine the verification path $VP_k$ for each leaf $l_k$. Different embodiments relating thereto will now be described in turn.

According to an embodiment, determining the verification path $VP_k$ for leaf $l_k$ involves the tree manager processor to, in a step S106a, determine auxiliary parameters $y_1, ..., y_m$ by applying a collision resistant function $\xi()$ to the leaves $l_1, ..., l_m$.

The output $y_k$ of the collision resistant function $\xi()$ may then be used as input to a combining function $F_m$. Hence, according to this embodiment the determination of the verification path $VP_k$ for each leaf $l_k$ involves the tree manager processor to, in a step S106b, determine a result from applying a combining function $F_m$ to the auxiliary parameters $y_1, ..., y_m$.

The root value RV in the tree may then be determined as the hash of a combining function, such that $RV=H(F_m(y_1, ..., y_m))$, where $H()$ is some hash function.

There may be different ways to determine the collision resistant function $\xi()$. Different embodiments relating thereto will now be described in turn. In general terms, it should be hard to find x, k, x', k' such that [x≠x' and/or k≠k'] and $\xi(k, x)=(k', x')$. In general terms, the collision resistant function $\xi()$ should be as secure as any hash functions used to determine the leaves, if the leaves are hash values. Additionally, $\xi()$ may include the index k in such a way that permutation of the leafs becomes impossible, and changing the index k (and, optionally, the value $x_k$) does not lead to another leaf with a valid verification path. Further, according to an embodiment, the collision resistant function $\xi()$ thus depends on k and $x_k$ for determining $y_k$ such that $y_k=\xi(k, x_k)$.

Figure 9:
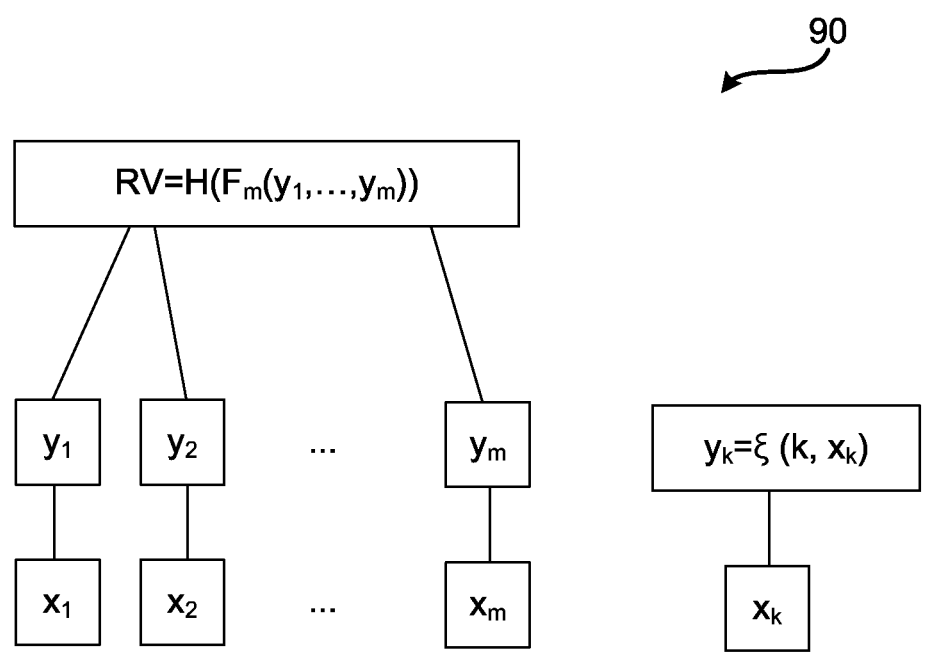
FIGS. 9, 10, and 11 are schematic illustration of trees according to embodiments.
Figure 10:
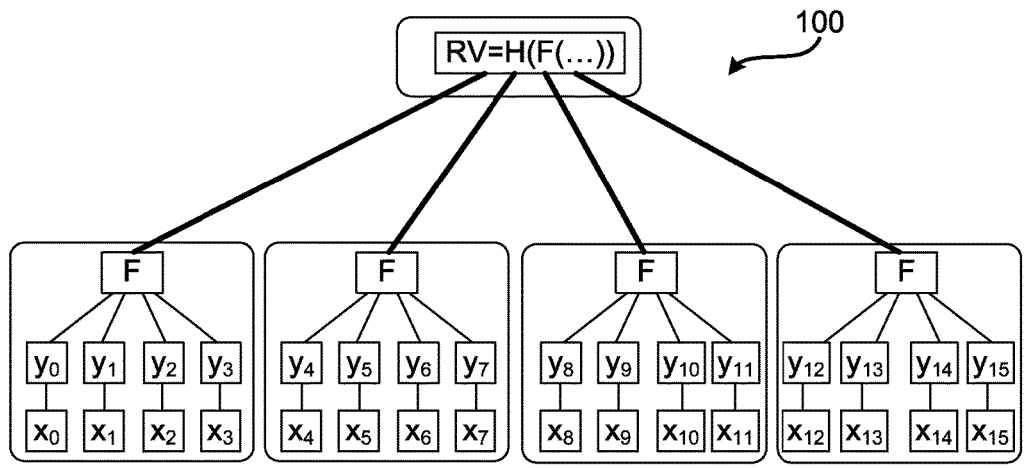

FIG. 9 schematically illustrates a tree 90 where the collision resistant function $\xi()$ has been applied, and where the root value RV has been determined as $RV=H(F_m(y_1, ..., y_m))$.

There may be different examples of the collision resistant function $\xi()$. For example, the collision resistant function $\xi()$ may be defined such that $y_k=k+H(H(x_k)||k)$, or $y_k=H(x_k||k)$, or $y_k=H(H(x_k||k))$, for k=1, ..., m, wherein $H()$ is a one-way function, such as a hash function, and where the operation "+" means an appropriate addition when hash values are viewed in a mathematical structure allowing additions.

There may be different ways to determine the combining function Fm. Different embodiments relating thereto will now be described in turn. In general terms the combining function $F_m$ may be provided as a family of functions $F_m(y_1, ..., y_m)$, where the length of the output is independent of the number of inputs m. This keeps the verification path at constant length, independent of the number of inputs. As, according to this embodiment, the verification path mainly consists of outputs of the combining function $F_m$, these outputs hence have to be independent of the number of inputs.

Further, there may exists a final function $F_{fin}(y, PR)$ such that $F_{fin}(y_k, PR_k)=F_m(y_1, ..., y_m)$ for $PR_k=F_{m-1}(y_1, ..., y_{k-1}, y_{k+1}, ... y_m)$, for k=1, ..., m. The final function may be the same for all leaves, or different for two or more of the leaves. A partial result using all inputs except one and the remaining input can be combined to compute the root value RV. The combining function itself may not be used to perform this last combining step, and therefore the final function is introduced. Both $F_m(y_1, ..., y_m)$ and $F_{fin}(y, PR)$ should be comparably easy to calculate. On the other hand, it should be computationally infeasible to fake a verification path. In other words, an attacker should not be able to create a valid verification path for a new value $x_k'$ that was not in the tree from the beginning. This does not need to be infeasible in theory, but finding such a fake path should take too much time in practice. Given y', y, PR it should be hard to find PR' such that $F_{fin}(y', PR')=F_{fin}(y, PR)$. The security level may be at least the security level of any chosen hash functions used to determine the leaves, if the leaves are hash values. Since the length of the partial result does not depend on m, the verification path of the tree becomes shorter than the path in the original Merkle tree when the number of leafs becomes large enough.

In the above, PR denotes a partial result. Hence, according to this embodiment, determining the verification path involves the tree manager processor to, in a step S106d, determine the partial result $PR_k$ for leaf $l_k$ by applying the combining function $F_{m-1}$ on all auxiliary parameters $y_1, ..., y_m$ except auxiliary parameter $y_k$. There may be different ways of determining the partial result. As noted above, one way to determine the partial result is $PR_k=F_{m-1}(y_1, ..., y_{k-1}, y_{k+1}, ..., y_m)$ and where an associated final function may be defined as $F_{fin}(y_k, PR_k)=F_m(y_1, ..., y_m)$.

The verification path $VP_k$ for the leaf $l_k$ may be dependent on k, $x_k$, and $PR_k$. For example, the verification path may then be determined from a vector $\{k, x_k, PR_k\}$ of parameters, where $PR_k$ is dependent on $F_{m-1}$. Hence, the verification path may further be dependent on the root value RV. The root value may be added to the verification path, or it could be ignored when the root value RV is a published/public value.

In many applications where $x_k$ represents sensitive information, leaf k may not wish that the tree manager gets knowledge of $x_k$. Moreover, $x_k$ may be large, which puts a communication burden on the leaf and the tree manager. However, instead of $x_k$, $H(x_k)$ can be used in order overcome the disclosure of $x_k$ to the tree manager and the communication effort. The verification path may thus further be dependent on $H(x_k)$. Hence, the tree manager processor may be configured to, in an optional step S108, determine a verification path for the hash, $H(x_k)$ of each leaf $l_k$, wherein the verification path for the hash $H(x_k)$ is dependent on k, $H(x_k)$, $PR_k$, and RV, where $PR_k$ is dependent on the combining function $F_{m-1}$ of $y_1, \ldots, y_{k-1}, y_{k+1}, \ldots, y_m$. The verification path for the hash may then be determined as a vector $\{k, H(x_k), PR_k\}$ of parameters, where $PR_k$ is dependent on $P_{m-1}$.

There may be different examples of the combining function $F_m$. For example, the combining function $F_m$ may be defined such that $F_m = (g^{y_1^* \cdots y_m})$ mod N, where g is an element in the group $Z_N^*$ and where N is a composite number. For example, g may be a generator in the group $Z_N^*$. For example, N may be defined as $N = p \cdot q$, where p and q are large prime numbers.

There may be further different ways to determine the verification paths. Different embodiments relating thereto will now be described in turn. For example, a one-way function H( ) may be applied to the result of the combining function. Hence, according to an embodiment the determination of the verification path $VP_k$ for each leaf $l_k$, involves the tree manager processor to, in a step S106c, apply a one-way function H( ) to the result (of the combining function). There may be different examples of the one-way function H( ). For example, the one-way function may be a hash function H( ). There may be different examples of hash functions. The hash function may be part of a Secure Hash Algorithm (SHA) such as SHA-1, SHA-256, SHA-512, or SHA-3, or Keccak-1600, etc.

The root value RV may be added to the verification path. Hence, the tree manager processor may be configured to, in an optional step S110, add the root value RV to the verification path.

The tree manager may pass the verification paths to the leaves. Hence, the tree manager processor may be configured to, in an optional step S112, distribute the verification path $VP_k$ for leaf $l_k$ to leaf $l_k$.

The tree manager may further pass the root value to the leaves. Hence, the tree manager processor may be configured to, in an optional step S114, distribute the root value RV to each leaf $l_k$.

Reference is now made to FIG. 7 illustrating a method for verifying a verification path of a leaf $l_k$ of a tree as performed by the verification processor according to an embodiment. Parallel reference is continued to FIG. 1.

The verification is performed by a verification processor. There may be different reasons for verifying a verification path. For example, the verification processor may be part of an entity that is to check a $VP_k$. The verification may be performed at some later time, sometimes even years after $VP_k$ was created. For example, assume a system where digital signatures are Do used on top of the verification paths. Then that signature may be verified later in time However, the verification may be performed directly after $VP_k$ has been created. There can be many different verification processors.

The verification processor is configured to, in a step S202, acquire a leaf value $x_k$ of leaf $l_k$ of a tree. The verification processor is further configured to, in a step S204, acquire a verification path $VP_k$ for the leaf. The verification processor is further configured to, in a step S206, a previously determined root value RV of the leaf. The value $x_k$ itself can be a hash of a large document—assume it is to be verified that a large document participated in computation of the root value—the verification processor then determines $x_k$=hash (document), and then check that ($x_k$ and $VP_k$) leads to the root value).

The verification processor is further configured to, in a step S208, verify the acquired verification path by determining a root value RV of its own of the leaf $l_k$ using the acquired verification path and the leaf value; and by comparing the previously determined root value RV to said root value RV of its own.

Reference is now made to FIG. 8 illustrating methods for verifying a verification path of a leaf $l_k$ of a tree as performed by the verification processor according to further embodiments.

There may be different ways for the verification processor to determine the root value RV of its own. One embodiment relating thereto will now be disclosed in more detail.

According to this embodiment the verification processor is configured to, in a step S208a, determine an auxiliary parameter $y_k$ by applying a collision resistant function $\xi( )$ to the leaf $l_k$. This collision resistant function $\xi( )$ is thus identical to the collision resistant function $\xi( )$ defined above.

According to this embodiment the verification processor is configured to, in a step S208b, acquire a partial result $PR_k$. The partial result $PR_k$ has been determined by the tree manager processor as disclosed above, i.e., by the tree manager processor having applied a combining function $F_{m-1}$ on auxiliary parameters $y_1, \ldots, y_m$ except auxiliary parameter $y_k$.

According to this embodiment the verification processor is configured to, in a step S208c, apply a final function $F_{fin}( )$ on $y_k$ and $PR_k$ such that the root value RV of its own equals $F_{fin}(y_k, PR_k)$. Hence, this final function $F_{fin}( )$ is identical to the final function $F_{fin}( )$ defined above, but here (only) applied to $y_k$ and $PR_k$.

Consider the following attack scenario. Assume an attacker picks another value of $x_k'$ and tries to create a verification path such that the verification will give the same root value RV as before. For this, the attacker determines $y_k' = \xi(k, x_k')$. Then, with a proper choice of PR', the verification path may lead to the same root value RV as before. Thus, the function $F_m$ must be such that it is difficult to find PR' that leads to a collision. In an illustrative example, the attacker needs to find PR' such that $PR'^{y_k'} = RV$ mod N, where –N is the product of two prime numbers p and q that are not known to the attacker. Finding such a PR' is a hard problem in practice if the factorization of N or its Euler totient $\varphi(N) = (p-1) \cdot (q-1)$ is not known. For a security level of $2^{128}$, the value of N should be around 3072 bits. The hashing of the combining function for obtaining the final root value RV can shrink the root value from 3072 bits down to 256 bits.

Different implementational aspects of the herein disclosed mechanisms for determining a verification path will now be disclosed.

It is possible to parallelize or distribute the computation over different layers such that a top tree is an aggregation of its children trees, each child tree having smaller number of children. This may be particularly advantageous when the number of leaves is large.

For example, a tree with $2^{20}$ leaves may be split into a top tree with $2^{10}$ leaves each of which is fed by the root of yet another 1024 child trees, each having $2^{10}$ leaves as well. This means that in total there could be $2^{20}$ leaves, parallelized or distributed into 1024+1 computational clusters.

Figure 11:
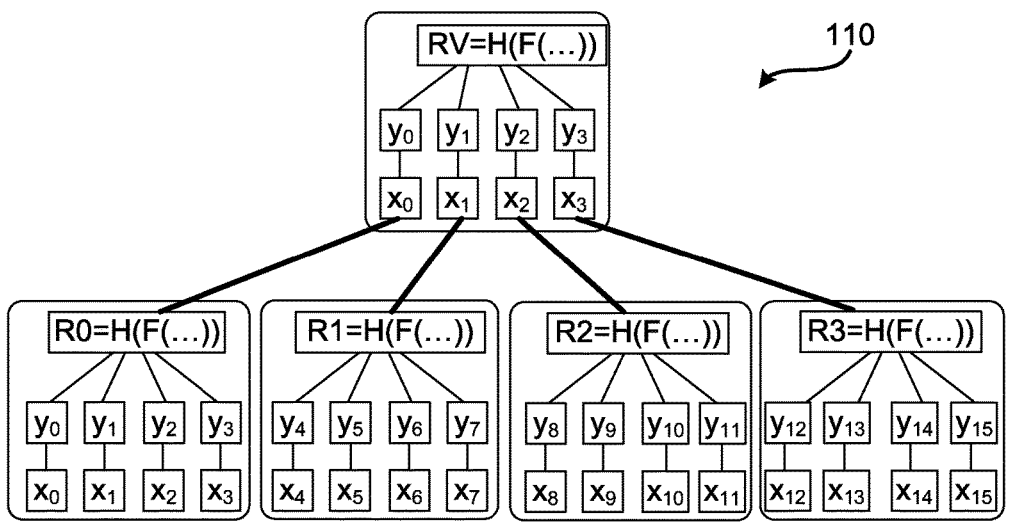

If the connection between children clusters is trusted, parallel computation may be performed. If the connection is not trusted, distributed computation may be performed. FIG. Do schematically illustrates a tree 100 for which parallel computation is performed. FIG. 11 schematically illustrates a tree 110 for which distributed computation is performed.

Some aspects of distributed computation will now be disclosed.

Assume that there are c+1 computation clusters and $m=n \cdot c$ leaves $l_1, \ldots, l_{mk-1}$. Then clusters $i=1 \ldots, c$ produce a collection of root values $RV_i$, and each cluster processes a portion of n input leaves out of the global m leaves, namely $l_{n \cdot i+j}$, for $j=1, \ldots, n$. The (c+1)-th cluster produces the collective root value RV having c leaves $RV_1, \ldots, RV_c$.

The verification path for a leaf $l_j$, $j=1, \ldots, m$, now comprises two parts; a verification path from leaf $l_j$ to root value $RV_i$, where $i=\text{floor}(1+(j-1)/n)$, and the verification path VP from root value $RV_i$ to root value RV.

The example above shows how the root value RV can be determined for $m=n \cdot c$ leaves having c+1 computation clusters, and thus the hierarchy is of height 2. However, if n is large, each cluster may be split into further sub-clusters to obtain a hierarchy of order 3 or more.

Some aspects of parallel computation will now be disclosed.

The same principles as for the distributed computation apply. However, instead of the verification path comprising chunks of verification paths, where each verification path is over a smaller number of leaves (n), in the parallel computation one verification path that is being computed in parallel over all leaves (m) is returned.

The determination of the verification path, the verification of the verification path, and as well as the distributed computation can all be performed using the above embodiments of the combining function Fm. Further, the combining function Fm may have properties such that:

$$F_m(y_1 \ldots y_m) = F_{fin}(y_k, F_{m-1}(y_1, \ldots, y_{k-1}, y_{k+1}, \ldots, y_m))$$

In order to define parallel computation, a new family of functions $Q_m(\ )$ based on this definition of the combining function may be defined. Particularly, define $Q_m(y_1, \ldots, y_m)$ such that $Q_m(y_1, \ldots, y_m) = Q_c(Q_n(y_1, \ldots, y_n), \ldots, Q_n(y_{m-n+1} \ldots y_m))$ and such that $F_m(y_1, \ldots, y_m) = F_{comb}(Q_m(y_1, \ldots, y_m))$ where $F_{comb}$ may not be the same as $F_{fin}$. Then each of the clusters $i=1, \ldots, c$ may compute its own $S_i = Q_n(y_{ni+1}, \ldots, y_{ni+n})$, and then the (c+1)-th cluster may compute $F_m(y_1, \ldots, y_m) = F_{comb}(Q_c(S_1, \ldots, S_c))$.

The verification path is the same as for the distributed computation.

There may be different ways to define the family of functions $Q_m$. For example, parallel computations may be performed as disclosed next. For example, parallel computations may be performed if the modification of the generic definitions of the combining function Fm is skipped. First, set $S_i = Q(y_{ni+1}, \ldots, y_{ni+n}) = y_{ni+1}^* \cdots *y_{ni+n}^*$. The (c+1)-th cluster may compute the root value RV as $H(g^{\{s1^*s2^* \cdots *sc\}} \mod N)$ or $g^{\{s1^*s2^* \cdots *sc\}} \mod N$. The verification path for any leaf $l_j$ may then be determined as $l_j \rightarrow \{p, x_k, PR_k = g^{\{s1^*s2^* \cdots *sc/yk\}} \mod N\}$.

The verification of the verification path is the same as for the case without parallel or distributed computation.

One particular embodiment for determining a verification path for each leaf $x1, \ldots, xm$ of a tree based on at least some of the above disclosed embodiments will now be disclosed in detail.

Assume that the one-way function $H(\ )$ is defined by SHA-256 with the security level $2^{128}$.

Assume that $\xi(\ )$ is defined such that $y_k = k + H(H(x_k)||k)$.

Assume that $F_m$ is defined as $F_m(y_1, \ldots, y_m) = (g^{y_1^* \cdots , y_m}) \mod N$, where $N = p \cdot q$, for two large enough primes p and q, and g is a generator in the group $Z_N^*$. The parameters N and g can be regarded as parameters of the tree; p and q are secrets that should not be known for anyone, and can be discarded after N has been calculated.

Thus, the root value RV is determined as RV=SHA-256 $(F_m(y_1, \ldots, y_m))$=SHA-256$((g^{y_1^* \cdots , y_m}) \mod N)$.

The partial computation value $PR_k$ can be determined as $PR_k = F_{m-1}(y_1, \ldots y_{k-1}, y_{k+1}, \ldots, y_m) = (g^{y_1^* \cdots , y_m/y_k}) \mod N$, and the function $F_{fin}(y_k, PR_k)$ is then defined as $F_{fin}(y_k, PR_k) = PR_k^{y} \mod N$.

Thus, the verification path $VP_k$ from $l_k$ to the root value RV is:

$$l_k \rightarrow VP_k := \{PR_k = g^{y_1^* \cdots *y_{k-1}^*y_{k+1}^* \cdots *y_m} \mod N, x_k, RV\}$$

The verification processor needs to determine its own root value RV'=SHA-256$(PR_k^{\xi(k,x_k)}) \mod N)$ and check that RV'=RV.

The verification path in the present example, when also including the index k, has a length of about 3360 bits; 3072 bits for PR, 256 bits for $x_k$, and about 32 bits fork, and depends only slightly on the number of leafs m, i.e., only the index k that grows $O(\log(m))$ is dependent on the number of leaves. It may also be so that the index K is not part of the verification path itself. In the calculations it has been assumed that $x_k$ is a hash of a large document (with SHA-256), but if the source of the leaf is smaller than, say 256 bits, the input value $x_k$ can be a plain value without hashing.

In an (original) Merkle tree for the same number of leaves, the size of the verification path with $2^{32}$ leaves is around 8224 bits, and for $2^{50}$ leaves it is around 12850 bits. Thus, according to the herein disclosed mechanisms the verification path is much shorter than for the original Merkle tree.

In summary, there has been proposed an alternative to a Merkle tree with m (which can be equal to $2^n$ or some other value) leaves and one root, but where the verification path is much shorter. Furthermore, the computations for a tree with many leaves can be parallelized or distributed in a tree of computational clusters.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for determining a verification path for each leaf $l_k$ of a hash tree used for secure storage of hash values corresponding to data associated with one or more clients operating in a communication network, the method being performed by a tree manager processor and comprising:

acquiring leaf values $x_k$ of leaves $l_k$, for $k=1, \ldots, m$ of the hash tree, each leaf value being a respective one of the hash values, or being derived therefrom;

determining a root value RV of the leaves $l_k$; and determining a verification path $VP_k$ from a leaf $l_k$ to the root value RV for each of the leaves, such that the size of each verification path is independent from the number of leaves m, where each verification path comprises a partial result and a function that enables determination of said root value RV from its leaf value and said partial result, and wherein said partial result for the verification path for leaf $l_k$ is determined as a one-way function depending only on other leaves $l_j \neq l_k$ such that the verification path for leaf $l_k$ prohibits re-computation of any other leaf value $x_j$ from said partial result; and wherein determining the verification path further comprises:
determining auxiliary parameters $y_1, \ldots, y_m$ by applying a collision resistant function $\xi(\ )$ to the leaves $l_1, \ldots, l_m$; and
determining a result from applying a combining function $F_m$ to the auxiliary parameters $y_1, \ldots, y_m$.

2. The method according to claim 1, wherein determining the verification path further comprises:
applying a one-way function to said result.

3. The method according to claim 2, wherein the one-way function is a hash function $H(\ )$.

4. The method according to claim 1, wherein determining the verification path further comprises:
determining said partial result $PR_k$ for leaf $l_k$ by applying the combining function $F_{m-1}$ on all auxiliary parameters $y_1, \ldots, y_m$, except auxiliary parameter $y_k$.

5. The method according to claim 4, where $PR_k = F_{m-1}(y_1, \ldots, y_{k-1}, y_{k+1}, \ldots, y_m)$.

6. The method according to claim 4, wherein the verification path is dependent on k, $x_k$, and $PR_k$, where $PR_k$ is dependent on the combining function $F_{m-1}$ of $y_1, \ldots, y_{k-1}, y_{k+1}, \ldots, y_m$).

7. The method according to claim 6, wherein the verification path is determined from a vector $\{k, x_k, PR_k\}$ of parameters.

8. The method according to claim 1, further comprising:
determining a verification path for the hash, $H(x_k)$, of each leaf $l_k$, wherein the verification path for the hash $H(x_k)$ is dependent on k, $H(x_k)$, $PR_k$, and RV, and where $PR_k$ is dependent on the combining function $F_{m-1}$ of $y_1, \ldots, y_{k-1}, y_{k+1}, \ldots, y_m$.

9. The method according to claim 8, wherein the verification path for the hash is determined as a vector $\{k, H(x_k), PR_k\}$, where $PR_k$ is dependent on $F_{m-1}$.

10. The method according to claim 1, wherein the collision resistant function $\xi(\ )$ depends on k and $x_k$ for determining $y_k$ such that $y_k = \xi(k, x_k)$.

11. The method according to claim 10, wherein the collision resistant function $\xi(\ )$ is defined such that $y_k = k + H(H(x_k)||k)$, or $y_k = H(x_k||k)$, or $y_k = H(H(x_k||k))$, for $k = 1, \ldots, m$, wherein $H(\ )$ is a one-way function.

12. The method according to claim 1, wherein the combining function, is defined as $F_m = (g^{y_1 * \cdots * y_m}) \bmod N$, where g is an element in the group $Z_N^*$ and where N is a composite number.

13. A method for verifying a verification path of a leaf $l_k$ of a hash tree used for secure storage of hash values corresponding to data associated with one or more clients operating in a communication network, the method being performed by a verification processor and comprising:
acquiring a leaf value $x_k$ of leaf $l_k$ of the hash tree, each leaf value being a respective one of the hash values, or being derived therefrom;
acquiring a verification path $VP_k$ for said leaf $l_k$;
acquiring a previously determined root value RV of the leaf; and
verifying the acquired verification path by determining a root value RV of its own of the leaf $l_k$ using the acquired verification path and the leaf value, and by comparing the previously determined root value RV to said root value RV of its own; and
wherein determining said root value RV of its own comprises:
determining an auxiliary parameter $y_k$ by applying a collision resistant function $\xi(\ )$ to the leaf $l_k$;
acquiring a partial result $PR_k$, the partial result $PR_k$ having been determined by a tree manager processor, by the tree manager processor having applied a combining function $F_{m-1}$ on auxiliary parameters $y_1, \ldots, y_m$ except auxiliary parameter $y_k$; and
applying a final function $F_{fin}(\ )$ on $y_k$ and $PR_k$, such that said root value RV of its own equals $F_{fin}(y_k, PR_k)$.

* * * * *